United States Patent

[11] 3,619,092

| | | |
|---|---|---|
| [72] | Inventor | Noriyuki Kurio<br>Hiroshima, Japan |
| [21] | Appl. No. | 46,853 |
| [22] | Filed | June 17, 1970 |
| [45] | Patented | Nov. 9, 1971 |
| [73] | Assignee | Toyo Kogyo Co. Ltd.<br>Hiroshima, Japan |
| [32] | Priority | June 17, 1969 |
| [33] | | Japan |
| [31] | | 44/57531 |

[54] DEVICE FOR ATTACHING A PISTON GEAR IN A ROTARY PISTON ENGINE
4 Claims, 3 Drawing Figs.

[52] U.S. Cl. .................................................. 418/61, 74/411
[51] Int. Cl. .................................................. F01c 1/02, F04c 1/02, F16h 57/00
[50] Field of Search .......................................... 418/54, 61; 74/411

[56] References Cited
UNITED STATES PATENTS

| | | | |
|---|---|---|---|
| 3,289,488 | 12/1966 | Breuer ......................... | 74/411 |
| 3,297,240 | 1/1967 | Tatsutomi ..................... | 418/61 |
| 3,400,604 | 9/1968 | Jones .......................... | 418/61 |

Primary Examiner—Carlton R. Croyle
Assistant Examiner—John J. Vrablik
Attorney—Sughrue, Rothwell, Mion, Zinn & Macpeak ABSTRACT: A device for attaching a piston gear in a rotary piston engine which has a rotary piston formed with a circular recess on an end face thereof, a piston gear mounted circumferentially and resiliently by spring pins within said circular recess and also having a step provided on the outer periphery thereof, and a snapring engaged with said step and inserted into a ring groove provided on the inner peripheral face of the recess to prevent the piston gear from moving in axial direction.

PATENTED NOV 9 1971 3,619,092
FIG.1
FIG.2
FIG.3
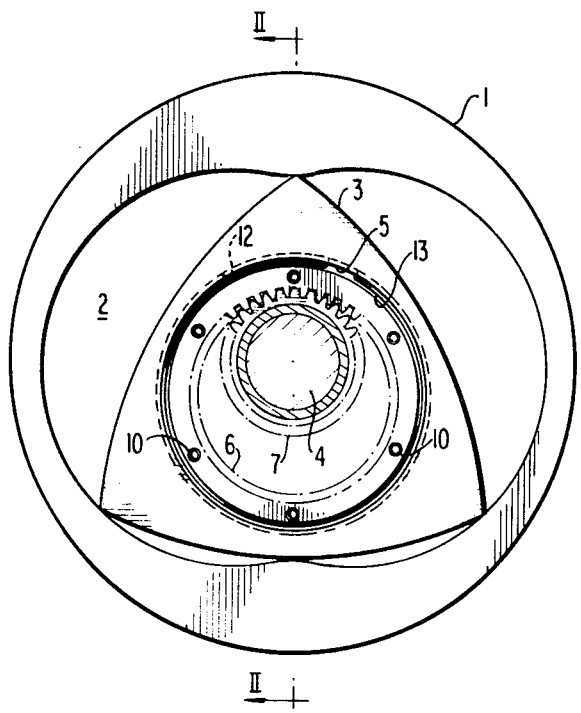
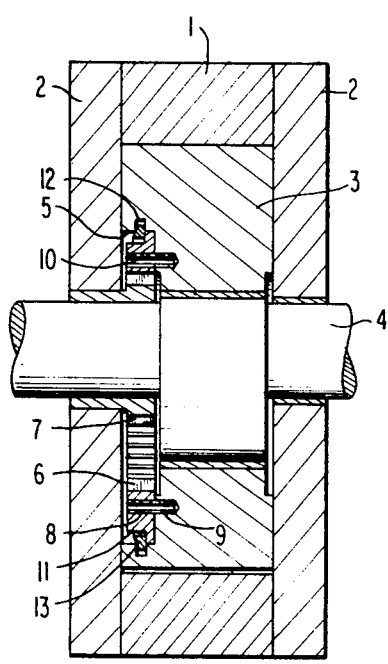
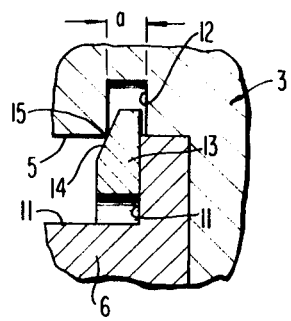
INVENTOR
NORIYUKI KURIO
BY Sughrue, Rothwell, Mion, Zinn & Macpeak
ATTORNEYS 3,619,092

DEVICE FOR ATTACHING A PISTON GEAR IN A ROTARY PISTON ENGINE

BACKGROUND OF THE INVENTION

This invention generally relates to a rotary piston engine and more particularly to a device for attaching a piston gear mounted on a piston which controls the rotation of the piston in a rotary piston engine by meshing with a fixed gear fixed onto an end wall of a casing.

In a rotary piston engine in which a rotary piston rotates in a planetary motion within a casing consisting of a center wall and end walls, the planetary motion of the rotary piston is generally controlled in such a manner that the externally toothed fixed gear fixed to the end wall is meshed with the internally toothed rotary piston gear mounted on the piston. The meshing of these gears controls only the planetary motion of the piston so that any load is not theoretically applied thereto, but in fact, due to the clearances of the respective components constituting the engine, the piston gear can receive instantaneous high load or shock load. For this reason, various types of devices have been proposed for the purpose of preventing the rotary piston gear from breaking due to such loads.

Pairs of pinholes have been formed on the end face of the rotary piston and the rotary piston gear so that a longitudinally slotted cylindrical spring pin is radially compressed and inserted into each pair of pinholes so that the piston gear is circumferentially and resiliently mounted on the end face of the piston by the resilience of the spring pins. In such a structure, if a high load is applied to the meshing portions of both gears, it may be absorbed by small circumferential movement of the piston gear against the resilience of the spring pins with respect to the end face of the piston. However, in such a structure where the spring pins are radially compressed and inserted vertically with respect to the end face of the piston, the piston gear tends to move away from the end face of the piston if an axial force acts on the piston gear.

SUMMARY OF THE INVENTION

This invention contemplates the elimination of the aforementioned disadvantages of the conventional securing devices in rotary piston engines.

It is an object of the present invention to provide a device for attaching a piston gear in a rotary piston engine which comprises a piston gear circumferentially and resiliently mounted on the end face of a piston by longitudinally slotted cylindrical spring pins inserted into each pair of aligned pinholes of the piston gear and the piston, and at the same time the piston gear is prevented from moving in the axial direction by a snapring inserted into a ring groove provided on the inner peripheral face of the recess of the end face of the piston and is in engagement with the outer periphery of the piston gear.

It is another object of the present invention to provide a device for attaching a piston gear in a rotary piston engine which comprises a snapring having an inclined face formed on the outer edge thereof for easy insertion of the snapring, so that the piston gear is prevented from moving axially by urging it toward the inner wall of the recess positively regardless of the accuracy of the manufacturing dimensions.

BRIEF DESCRIPTION OF THE DRAWINGS

FIG. 1 is a vertical sectional view of a device for attaching a piston gear in a rotary piston engine constructed in accordance with the present invention;

FIG. 2 is a vertical sectional side view of the device taken along the line II—II in FIG. 1; and FIG. 3 is an enlarged sectional view of part of the device shown in FIG. 2.

DESCRIPTION OF THE PREFERRED EMBODIMENT

Reference is now made to the drawing, which shows one embodiment of the present invention. In the drawing, reference numeral 1 designates a center wall having two or more end walls 2 sealingly disposed on both sides of the center wall 1. A three or more apexed rotary piston 3 moves in a planetary motion and is supported on an eccentric shaft 4 within a casing consisting of the center wall 1 and the end walls 2. Numeral 5 is a recess provided on the end face of the rotary piston 3, 6 is an internally toothed rotary piston gear fixed on the rotary piston 3 within the recess 5, and 7 designates an externally toothed fixed gear meshed with the rotary piston gear 6 and fixed to one of the end walls 2.

Numerals 8 and 9 are a pair of pinholes provided on the rotary piston gear 6 and the rotary piston 3, respectively, and 10 is a spring pin having a longitudinal slot. This spring pin 10 is radially compressed and inserted into the aligned pinholes 8 and 9 so that the rotary piston gear 6 is mounted on the recess of the rotary piston 3.

Numeral 11 is a step provided on the outer periphery of the piston gear 6, 12 is an annular groove provided on the inner peripheral face defining the recess 5 of the rotary piston 3. Numeral 13 designates a snapring having an outwardly expanding force and inserted into the ring groove 12 in engagement with the step 11 of the outer periphery of the piston gear 6 for preventing the piston gear from moving axially. The snapring 13 is inserted in compression of its diameter into the recess 5 of the piston so that it is engaged with the annular groove 12 by the expanding force of the snapring itself. Further, the step 11 may be formed as a groove provided on the outer periphery of the piston gear 6 instead of being defined by a peripheral flange as shown in the drawings.

In accordance with this embodiment of the invention, an inclined face 14 is formed on the outer edge of the snapring 13 so that when inserted into the annular groove 12, the inclined face 14 contacts the corner portion 15 of the groove 12, thereby facilitating the assembling of the snapring and insuring that the piston gear is positively retained within the recess 5 by the expanding force of the snapring 13 regardless of any manufacturing errors.

In the operation of the device of the present invention, when the rotary piston 3 rotates with the piston gear 6 in meshed engagement with the fixed gear 7, even if a high load or shock load is applied to the rotary piston gear 6, such a load or shock may be absorbed by the circumferential movement of the rotary piston gear 6 against the resilience of the spring pins 10 and accordingly, the breakage of the fixed gear 7 or rotary piston gear 6 may be prevented. And, since the snapring 13 inserted into the ring groove 12 is engaged with the step 11 of the piston gear 6, even if an axial force acts on the piston gear 6, the piston gear 6 is retained in position within the piston recess 5.

Further, since the inclined face 14 is provided on the outer edge of the snapring 13, the distance between the step 11 of the piston gear 6 and the bottom wall of the recess 5 of the piston, or disposition and dimension of the ring groove 12 need not be accurately finished so as to mount the piston gear accurately. For this reason, the device of the present invention provides a simple structure that is less expensive for mass production than other devices for attaching a piston gear in a rotary piston engine.

I claim:

1. In a rotary piston engine having a casing defined by a center wall and end walls, a rotatable shaft extending through said casing, a piston eccentrically mounted on said shaft for planetary motion within said casing, a gear fixed to one of said end walls, and a piston gear secured to said piston and in meshing engagement with said fixed gear to control planetary movement of said piston; an improved assembly for securing said piston gear to said piston wherein said piston has a recess in an end face thereof in which said piston gear is positioned, said piston gear and the inner wall of said recess have a plurality of aligned holes, a flexible and resilient pin is inserted in compressed condition into each pair of said aligned holes, the peripheral face of said piston recess has an annular groove therein, said piston gear has a step on the outer periphery thereof, and a snapring having an expanding force is inserted into said annular groove in engagement with said step on said piston gear.

2. A device as set forth in claim 1 wherein said pin is longitudinally slotted.

3. A device as set forth in claim 1 wherein said recess is circular, and said piston gear and fixed gear are annular in shape.

4. A device as set forth in claim 1, wherein an inclined face is formed on the outer edge of said snapring, said inclined face contacting the corner portion of said annular groove to urge said piston gear into engagement with the inner wall of said recess by the expanding force of said snapring.

* * * * *